US012070630B2

(12) United States Patent
Cowell et al.

(10) Patent No.: US 12,070,630 B2
(45) Date of Patent: Aug. 27, 2024

(54) ROPED ACCESS SYSTEM

(71) Applicant: Treemagineers Ltd., Scotland (GB)

(72) Inventors: Christopher Sidney Cowell, Scotland (GB); Elliot James Tanner, Wales (GB)

(73) Assignee: TREEMAGINEERS LTD., Pitlochry (GB)

(*) Notice: Subject to any disclaimer, the term of this patent is extended or adjusted under 35 U.S.C. 154(b) by 593 days.

(21) Appl. No.: 16/384,224

(22) Filed: Apr. 15, 2019

(65) Prior Publication Data

US 2019/0314650 A1 Oct. 17, 2019

(30) Foreign Application Priority Data

Apr. 13, 2018 (GB) ...................................... 1806126

(51) Int. Cl.
*A62B 1/06* (2006.01)
*B66D 1/04* (2006.01)
(Continued)

(52) U.S. Cl.
CPC .................. *A62B 1/06* (2013.01); *B66D 1/04* (2013.01); *B66D 1/7489* (2013.01); *A62B 35/0075* (2013.01)

(58) Field of Classification Search
CPC .... A62B 1/06; A62B 1/18; A62B 1/14; A62B 35/0075; A62B 35/0081; B66D 1/04;
(Continued)

(56) References Cited

U.S. PATENT DOCUMENTS 2,195,299 A * 3/1940 Frankel .................. A62B 35/04 182/59
2,773,566 A * 12/1956 Staggers ................... E04G 3/32 188/65.1
(Continued)

FOREIGN PATENT DOCUMENTS

CN 1225602 A 8/1999
CN 101065317 A 10/2007
(Continued)

OTHER PUBLICATIONS

M Bridge: "Hitch Climbers' Guide to the Canopy Guidance for the use of the certified Hitch Climber System", 2009, XP55608211, Retrieved from the Internet: URL: http://www.treemagineers.com/pdf /hitch_climbers_guide.pdf [retrieved on Dec. 7, 2023].
(Continued)

*Primary Examiner* — Daniel P Cahn
*Assistant Examiner* — Shiref M Mekhaeil
(74) *Attorney, Agent, or Firm* — NIXON & VANDERHYE

(57) ABSTRACT

Disclosed is a pulley assembly in a roped access system including first and second plates and a sheave carried for rotation about an axis normal to the plates. An aperture passes through each plate parallel to the axis. The plates have a closed condition when the apertures are coaxial with one another and the plates are in contact near the apertures, forming a rope passage extending between the plates adjacent the sheave, having an upper part smaller than parts of the passage below that upper part. A roped access system includes a climbing rope passing through the rope passage and a tether connected to the climbing rope above the pulley assembly by a friction hitch and an aperture of the pulley assembly, the hitch. The hitch grips the rope upon downward
(Continued)

force to the tether, releasing its grip upon upward force to the friction hitch by pulley assembly plates.

17 Claims, 9 Drawing Sheets

(51) Int. Cl.
*B66D 1/74* (2006.01)
*A62B 35/00* (2006.01)

(58) Field of Classification Search
CPC ........ B66D 1/7489; B66F 11/00; B66F 11/04; B66F 11/042; B66F 11/044; B66F 13/00; B66F 17/006; A63B 29/02; A63B 29/08; A63B 27/00; A63B 27/02; A63B 27/04
USPC .............................................................. 182/5
See application file for complete search history.

(56) References Cited

U.S. PATENT DOCUMENTS 3,542,158 A * 11/1970 Arnold .................. F16G 11/101 182/5
3,717,219 A * 2/1973 Hoffman .................. A62B 1/14 182/135
4,513,954 A * 4/1985 Cantamessa .......... F16F 1/3732 403/194
4,546,851 A * 10/1985 Brennan ............ A62B 35/0075 182/7
4,667,772 A * 5/1987 Kammerer ............. A62B 35/04 24/136 L
5,351,906 A * 10/1994 Feathers .................. A62B 1/10 242/396.6
5,400,869 A * 3/1995 Rocourt ................... A62B 1/14 182/5
5,722,612 A * 3/1998 Feathers ............ A62B 35/0093 242/381.5
5,845,894 A 12/1998 Petzl
5,878,833 A * 3/1999 Bell ..................... A62B 35/005 182/5
5,927,438 A * 7/1999 Ostrobrod ................ A62B 1/08 182/7
6,085,866 A 7/2000 Kowalewski
6,488,267 B1 * 12/2002 Goldberg ............... A63B 29/02 254/264
6,810,997 B2 * 11/2004 Schreiber ................. A62B 1/10 182/233
7,980,524 B2 * 7/2011 Parker .................... A62B 35/04 248/317
8,033,968 B2 * 10/2011 Chen ................ A63B 21/00047 482/141
8,851,232 B2 * 10/2014 Raoul Bingham .... A63B 29/02 182/5
D860,766 S * 9/2019 Brown ..................... A62B 1/18 D8/360
D869,263 S * 12/2019 Cowell .......................... D8/356
10,881,884 B1 * 1/2021 Siegel ...................... A62B 1/06
2004/0018926 A1 1/2004 Bogatez
2005/0051385 A1 * 3/2005 Klingler ................... A62B 1/14 182/5
2007/0175698 A1 * 8/2007 Ketring .................... A62B 1/14 182/8
2012/0118666 A1 * 5/2012 Raoul Bingham .... A63B 29/02 182/5
2012/0241700 A1 * 9/2012 Mauthner ................ A62B 1/14 254/391
2013/0192923 A1 * 8/2013 Kennedy .................. A62B 1/06 182/5
2014/0311834 A1 * 10/2014 Lawton .................... A62B 1/14 188/65.2
2015/0375758 A1 * 12/2015 Strasser ................. A63G 21/22 29/892.1
2016/0130875 A1 * 5/2016 Hwang .................... A62B 1/14 182/5
2017/0193799 A1 * 7/2017 Holub ................ A62B 35/0075
2017/0203133 A1 * 7/2017 Majala ............... A62B 35/0093

FOREIGN PATENT DOCUMENTS

CN 101112643 A 1/2008
CN 206088873 U 4/2017
DE 102 20 758 A1 11/2003
EP 0803268 A1 10/1997
GB 2557308 A 6/2018
WO 2013/070269 A1 5/2013

OTHER PUBLICATIONS

Office Action, issued in Chinese Patent Application No. 201910279643.7 dated Jan. 12, 2022.

* cited by examiner

ROPED ACCESS SYSTEM

BACKGROUND TO THE INVENTION

Field of the Invention

This invention relates to a roped access system, such as might, for example, be used by arborists or others working at height for obtaining access by climbing a rope. In particular, it relates to an assembly that is a component of such a roped access system.

Throughout this specification, terms such as "upper" and "lower" and related terms that refer to height are to be taken to refer to the item described when it is in normal use in a roped access system with a vertical or near-vertical climbing rope.

In general, a roped access system allows a person to ascend a climbing rope, spend time suspended from the climbing rope, for example to complete a task, and then descend the rope in a controlled manner. A roped access system may be configured to use stationary-rope technique (SRT), in which the climbing rope is a single fixed line, or moving-rope technique (MRT) (DRT) in which the climbing line passes over a pulley, ring, branch or other support at its highest point, which can be used to provide a climbing person with a mechanical advantage over their own weight.

In both techniques, it is common for a climber to be attached to the climbing rope using a tether. The tether extends from a harness worn by the climber to the climbing rope and is attached to the climbing rope using a friction hitch such as a Prusik knot. A characteristic of a friction hitch is that when the tether is unloaded, it can slide upon the climbing rope, but when the tether is loaded, it locks onto the climbing rope. Thus, it is possible for a climber to be suspended from the tether with the friction hitch locked at a fixed position on the climbing rope or to ascend or descend the climbing rope by unloading the tether.

SUMMARY OF THE PRIOR ART

Various devices have been produced to help performance of roped access using these techniques. These typically serve to facilitate connection between a user's harness and the tether, and to act as a "Prusik minder" that ensures the friction hitch travels along the climbing rope closely following the user.

FIG. 1 shows a prior art arrangement for carrying out roped access using SRT. A climbing rope 10 is connected at its upper end to a fixed anchorage 12 and hangs vertically down from the anchorage 12. A tether 14 is constituted by a rope that has a loop 18 formed at each of its ends. The tether 14 is secured to the climbing rope 10 by a friction hitch such as a Prusik knot 16. A carabiner 20 is passed through each of the loops 18 and can be used to connect the tether to an anchorage point of a user's harness. In this configuration, if a user loads the tether by lowering their weight onto the harness, the Prusik knot 16 will tighten and lock the tether 14 to the climbing rope 10, while if weight is borne elsewhere, such as by the user locking the climbing rope 10 with their feet, the Prusik knot will loosen so that it can slide up and down the climbing rope 10. These are the components of a traditional SRT arrangement.

The known modification is to include a rigging pulley 24 that comprises two plates between which a sheave is carried for rotation. Several (in this case three) holes are formed through each plate. There is an axis that extends through the rigging pulley 24 such that the holes lie to one side and the sheave to an opposite side of the axis. In the assembled apparatus, the climbing rope 10 passes between the two plates, generally along the axis, in contact with the sheave. The carabiner 20 passes through the lowermost of the holes in the plates.

FIGS. 2*a* to 2*d* show an operating sequence for ascending using the arrangement described above. This progresses as follows:

1. The prusik knot 16 is above pulley 24; it locks when the tether 14 is loaded downwards;
2. The climbing rope 10 pulls through the pulley 24 as the user ascends the climbing rope 10;
3. A top face of pulley 24 contacts the Prusik knot 16 which causes the knot to release; and
4. As the pulley 24 rises, it pushes the Prusik knot 16 upwards.

The above describes a system configured for SRT but the same principles are used for MRT. Advancement up the climbing rope can be made either by the user pulling the rope through the device by taking weight off the system or thrusting upwards, for example, from a foot ascender.

The above description is intended only to set the context in which the present invention may be used. Those skilled in the field will realise that there are many possible additions and variations that me be available or are required depending on the specific circumstances in which the access system will be used.

SUMMARY OF THE INVENTION

An aim of this invention is to provide an improved pulley for use in a roped access system.

From a first aspect, this invention provides a pulley assembly comprising first and second spaced plates and a sheave carried for rotation about an axis normal to the plates, there being at least one aperture formed through each plate in a direction parallel to the sheave axis, the plates having a closed condition in which the apertures of the plates are coaxial with one another and the plates are in contact in the vicinity of the aperture to form a rope passage that extends between the plates adjacent to the sheave, wherein the rope passage has an upper part that is of lesser size than parts of the rope passage below that upper part.

This arrangement inhibits the tendency of a knot formed on a rope that passes through the rope passage from entering the top of the rope passage, without limiting the size of the lower part of the rope passage.

Preferably, the plates are of greater thickness adjacent to an upper opening of the rope passage. This can maximise the area of the plates that makes contact with a knot formed on a rope that passes through the rope passage.

Advantageously, the rope passage has a lower part that is enlarged with respect to other parts of the rope passage. For example, the lower part of the rope passage may be flared. This allows a rope that passes through the rope passage to move through the pulley assembly with minimal contact against the plates, and therefore a minimum of friction.

An end portion (or both end portions) of the rope passage may be curved to provide a convex surface facing the sheave. This provides a curved entry to the rope passage over which a rope can slide smoothly.

Each plate may have a plurality of apertures formed through each plate in a direction parallel to the sheave axis, one of which is a top aperture, each of the apertures in respective plates being coaxial with an aperture in the other of the plates when the plates are in the closed condition. Such embodiments typically have three apertures in each plate: a top, a middle and a bottom aperture. Advantageously, the centre of the upper aperture may be further from the sheave axis than the centre of or each other aperture.

From a second aspect, this invention provides roped access system comprising a climbing rope, a portion of which passes through the rope passage of a pulley assembly embodying the first aspect of the invention, and a tether that is connected to the climbing rope above the pulley assembly by a friction hitch and to an aperture of the pulley assembly, the friction hitch being configured to grip the climbing rope upon application of a downward force to the tether and to release its grip on the climbing rope upon upward force applied to the friction hitch by plates of the pulley assembly.

In such a roped access system a part of the climbing rope above the pulley assembly is fixed. This constitutes a system configured for SRT.

Alternatively, the climbing rope extends past the friction hitch upwardly from the pulley assembly to pass slidingly over a high point or several high points (typically through a pulley, but alternatively through a ring, over a branch or other anchor) and then to extend downwardly to be fixedly connected to the pulley assembly. This constitutes a system configured for MRT.

The tether is typically connected through a second connector to an aperture of the pulley assembly. Where the plates of the pulley assembly include a plurality of apertures, the climbing rope is typically fixedly connected to an upper aperture (e.g., the top aperture) through a first connector (e.g., a carabiner). In such embodiments, the tether is typically connected through a second connector (e.g., a carabiner) to an aperture below that to which the first connector is attached. In typical embodiments, the second connector is suitable for connection to a component of a harness to transfer the weight of a user of the harness to the tether.

DETAILED DESCRIPTION OF THE PREFERRED EMBODIMENT

Figure 1:
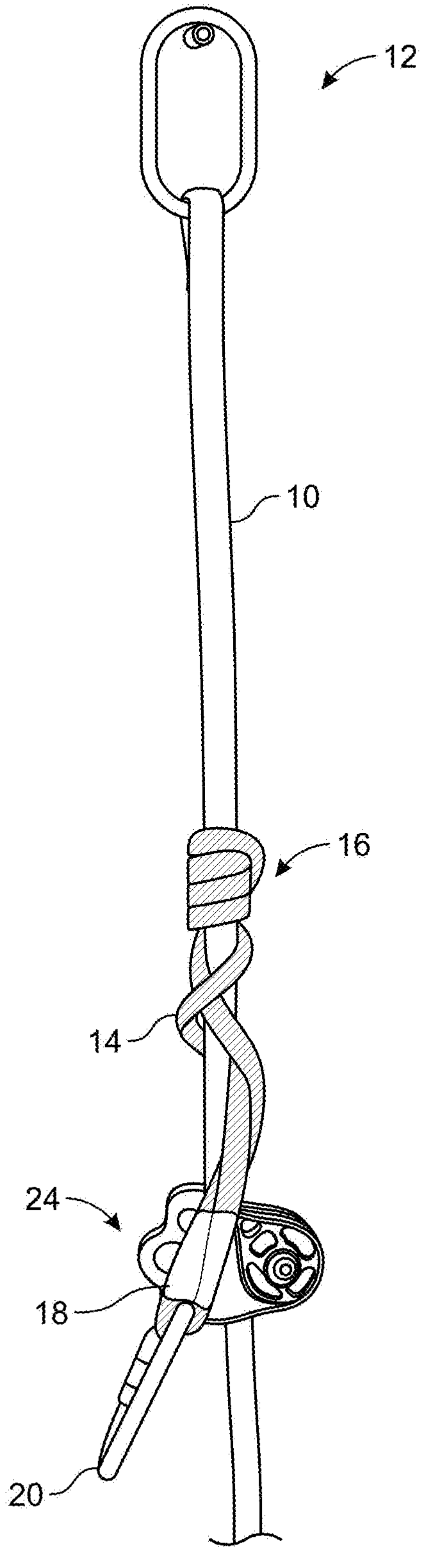
FIG. 1 (PRIOR ART)
FIGS. 1 and 2*a* to 2*d* show a known roped access system.
Figure 2A:
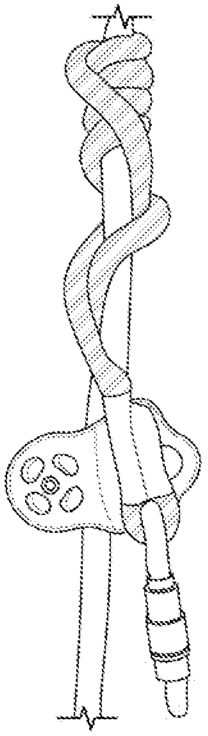
FIG. 2a (Prior Art)
Figure 2B:
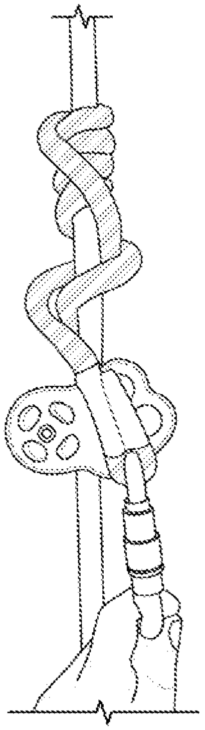
FIG. 2b (Prior Art)
Figure 2C:
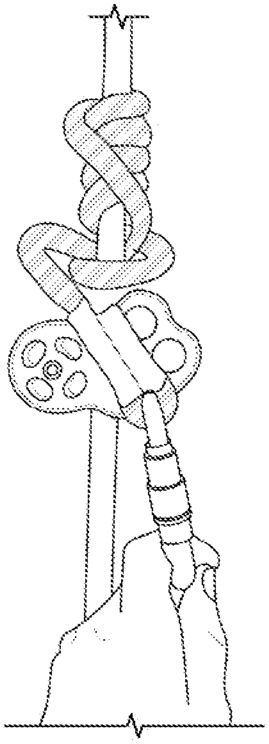
FIG. 2c (Prior Art)
Figure 2D:
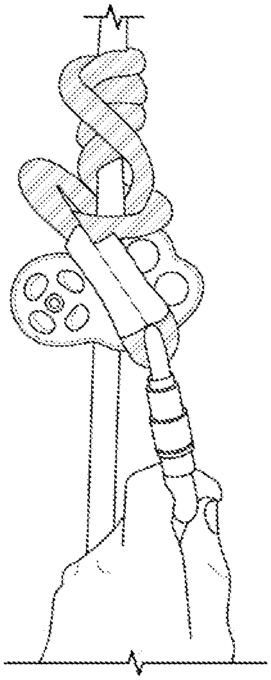
FIG. 2d (Prior Art)
Figure 3:
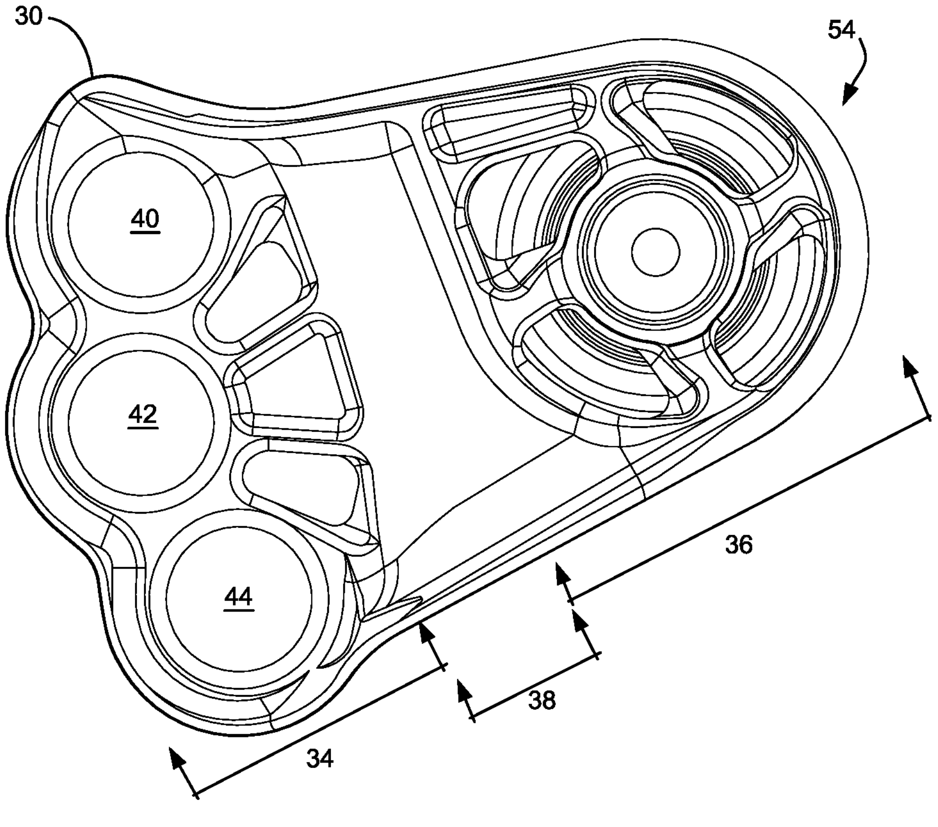
FIGS. 3 and 4 are views from opposite sides of a pulley assembly being an embodiment of the invention, the pulley assembly being shown in substantially the orientation that it adopts when in use.
Figure 4:
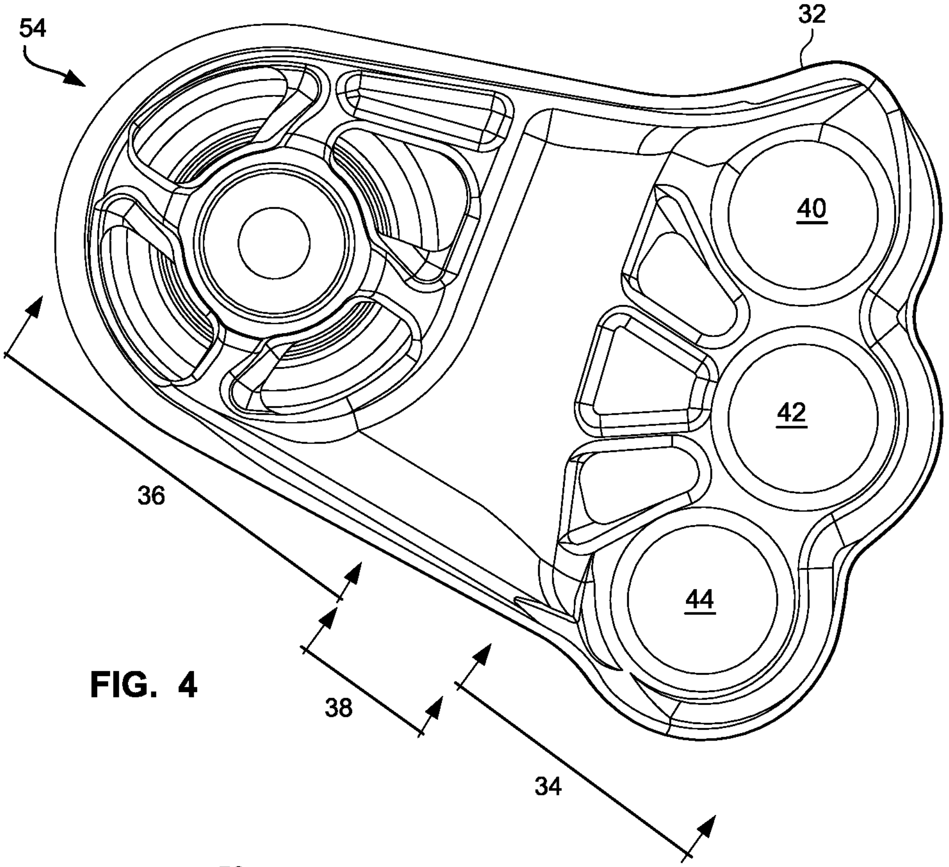

Embodiments of the invention will now be described in detail, by way of example, and with reference to the accompanying drawings.

An embodiment of the present invention provides a rigging pulley assembly that comprises first and second plates 30, 32, typically of cast or forged metal alloy. The plates 30, 32 are not identical, but are mirror images of one another. The plates 30, 32 are arranged such that the assembly is symmetrical about a median plane M.

Each plate 30, 32 has a connection region 34, a sheave region 36 between which is an intermediate region 38. The plates 30, 32 are in contact with one another at their connection regions 34, contact being made on the median plane M. Three circular connection apertures 40, 42, 44 are formed through the plates 30, 32 within the connection region 34, these being referred to as the top, middle and bottom apertures respectively. The symmetry of the plates 30, 32 means that the apertures in each plate align with a corresponding aperture in the other plate.

The plates 30, 32 are curved such that they spread apart from one another in the intermediate region 38 such that they are spaced-apart and have inward, mutually-facing surfaces that are approximately parallel to one another at the sheave region 36. Remote from the intermediate region 38, the plates in the sheave region 36 have an approximately semi-circular periphery at 54. An axle bore extends through each plate 30, 32 in the sheave region 36, the axle bores being centred on a sheave axis S that is coincident with the centres of the semi-circular peripheries. Each axle bore is counterbored with lengths remote from one another being of greater diameter than the lengths that are proximal to one another.

A sheave 60 is disposed between the mutually-facing parallel surfaces of the plates 30, 32 in the sheave region 36. The sheave 60 is carried on the outer races of rolling-element bearings 64, 66, the inner races of which are supported on an axle 68 that passes through the axle bores, whereby the sheave 60 can rotate freely about the sheave axis S. A void 70 is formed within the axle 68 to reduce its mass. Also carried on the axle 68 is a spacer 52 between the bearings that makes contact with the inner races. The axle 68 is riveted to a nut 50 to clamp the plates 30, 32, inner races and spacer 52 together. This arrangement allows the plates to pivot with respect to one another about the sheave axis S.

The space between the intermediate region 38 forms a rope passage 46 between the plates 30, 32 adjacent to the sheave 60 (which will be described below). The curve of the plates 30, 32 as they spread within the intermediate region 38 forms a smoothly curved wall of the rope passage 46 facing the sheave 60.

In contrast to conventional rigging pulleys, the plates of the present embodiment are asymmetrical, reflecting the fact that different parts of the plate perform different functions when in use. Thus, the present embodiment has a top and a bottom and is intended for use on a rope in a specific orientation. Specifically, the upper edges of the plates serve to make contact with and to push the Prusik knot while the lower edges of the plates serve to guide the climbing rope as it passes into or out of the pulley assembly. This will now be described in more detail.

Figure 5:
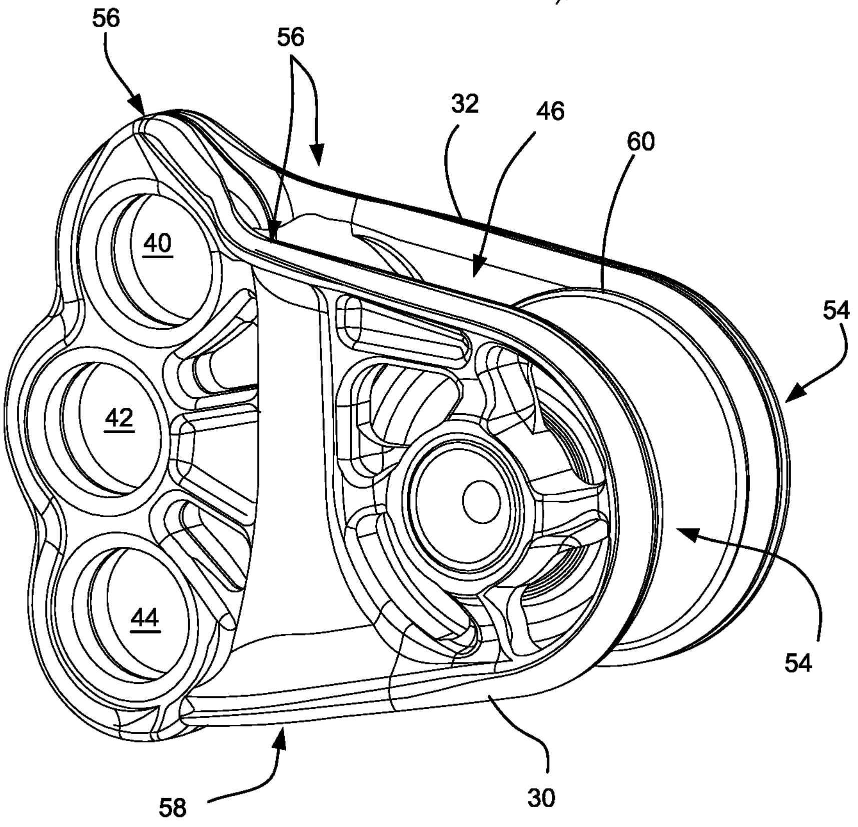
FIGS. 5 and 6 are oblique views of the embodiment of FIGS. 3 and 4.
Figure 6:
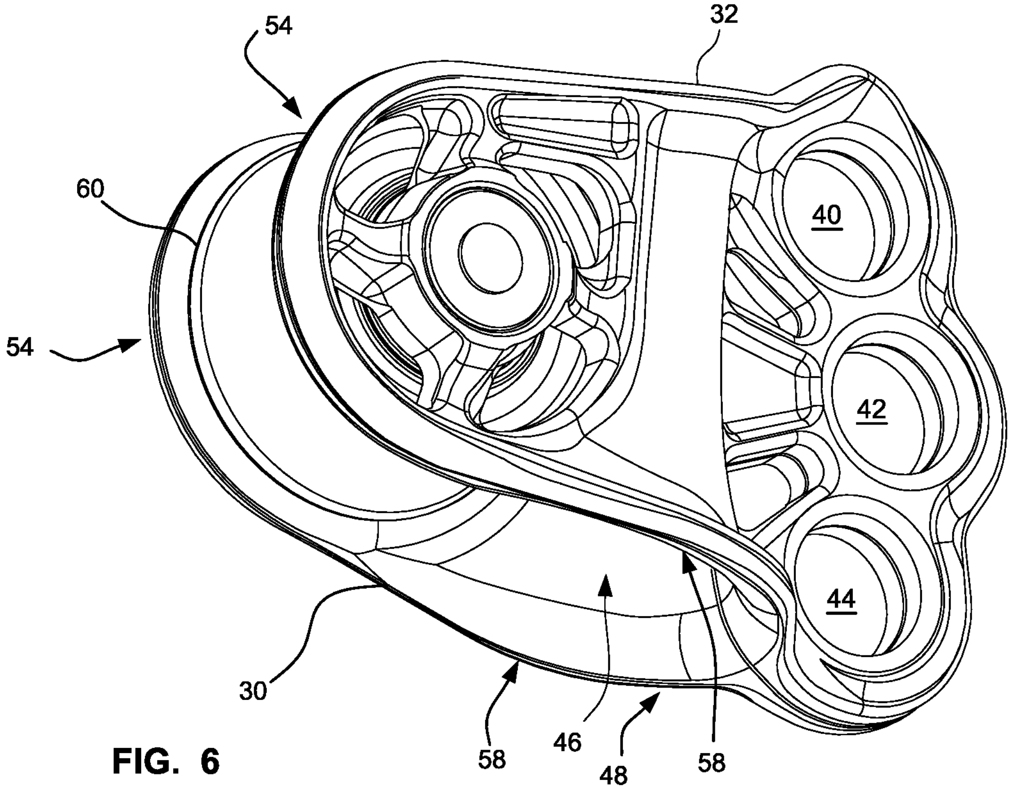
Figure 7:
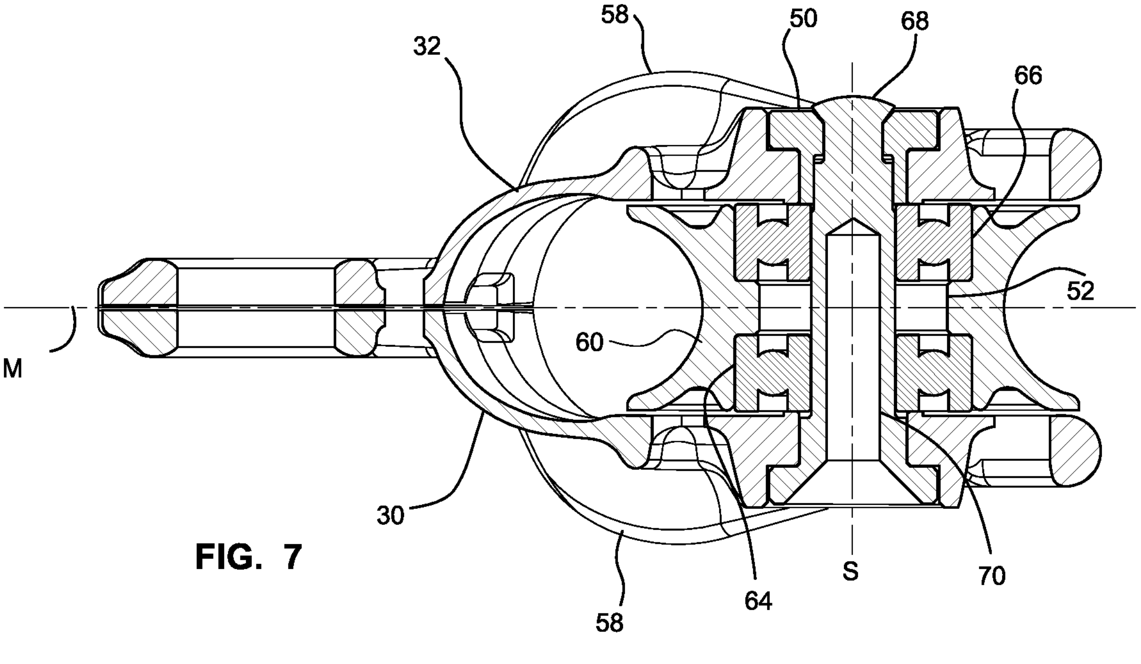
FIGS. 7, 8 and 9 are sectional views of the embodiment of FIGS. 3 and 4.
Figure 8:
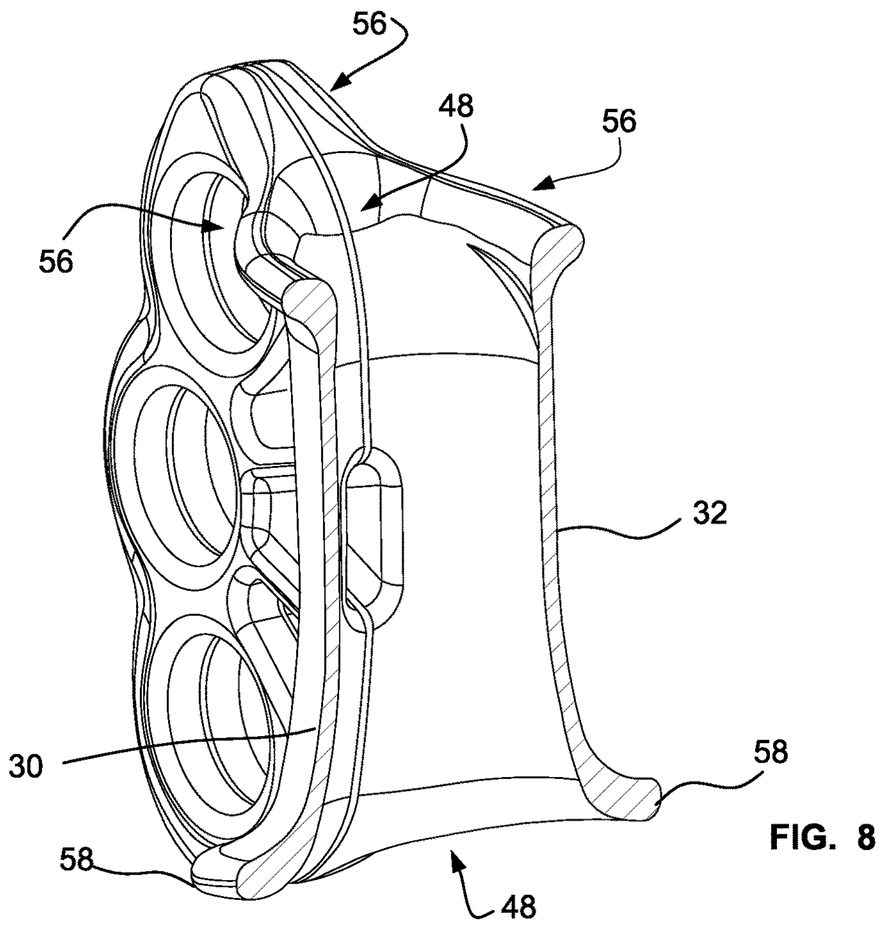

Upper edges of the plates 30, 32 make contact with the Prusik knot in regions indicated at 56 in FIGS. 5 and 8 (which may be thought of as the upper end of the rope passage 46). When the plates are pushing the Prusik knot along the climbing rope, it is preferable that the knot remains outside of the periphery of the plates 30, 32 and does not get drawn into the space between them. With this aim in mind, the thickness of the plates 30, 32 in this region is greater than elsewhere, the aim being to provide as large a surface area as is practical to contact the Prusik knot, without unduly increasing the weight of the pulley assembly. In the intermediate region 38, the spacing between the plates 32, 32 is as narrow as possible, taking into account the thickness of the climbing rope with which the pulley assembly is intended to be used. Typically, the spacing is wide enough to allow the climbing rope to feed into the pulley assembly without causing friction on the side plates. This will be just a little greater than the maximum diameter of the specified rope. The plates 30, 32 are shaped to have convex curved surfaces adjacent to the upper end of the rope passage 46 to ensure that a rope does not encounter any sharp edges as it moves through the assembly.

In contrast, the lower edges of the plates 30, 32 are flared in the intermediate region 38 as indicated at 58 (which may be thought of as the upper end of the rope passage 46). The flares 58 serve to reduce the friction when a rope is pulled through the pulley assembly from underneath, such as to raise the device on the rope and push a Prusik knot. The flares 58 ensure that a rope running on the sheave 60 does not come into contact with the plates 30, 32 to help minimise friction between the rope and the pulley assembly. Also, if rope is fed 'unfair' into the pulley assembly, the flares 58 help to guide the rope on to the sheave 60 to minimise friction, and so maintain proper function of the friction hitch.

It will also be seen from the figures that at the upper and lower ends of the rope passage, the material of the plates 30, 32 curves away from the sheave 60 as indicated at 48. This provides a curved entry to the rope passage 46 over which a rope can slide smoothly.

The top, middle and bottom apertures 40, 42, 44 are located asymmetrically with respect to the sheave axis S. The distance of the centre of the top aperture 40 from the sheave axis S is greater than the distance of the centres of the middle and bottom apertures 40, 44 from the sheave axis S. This allows the upper part of the rope passage 46 to be larger than would be the case for a symmetrical arrangement without enlarging the overall size of the assembly.

Figure 9:
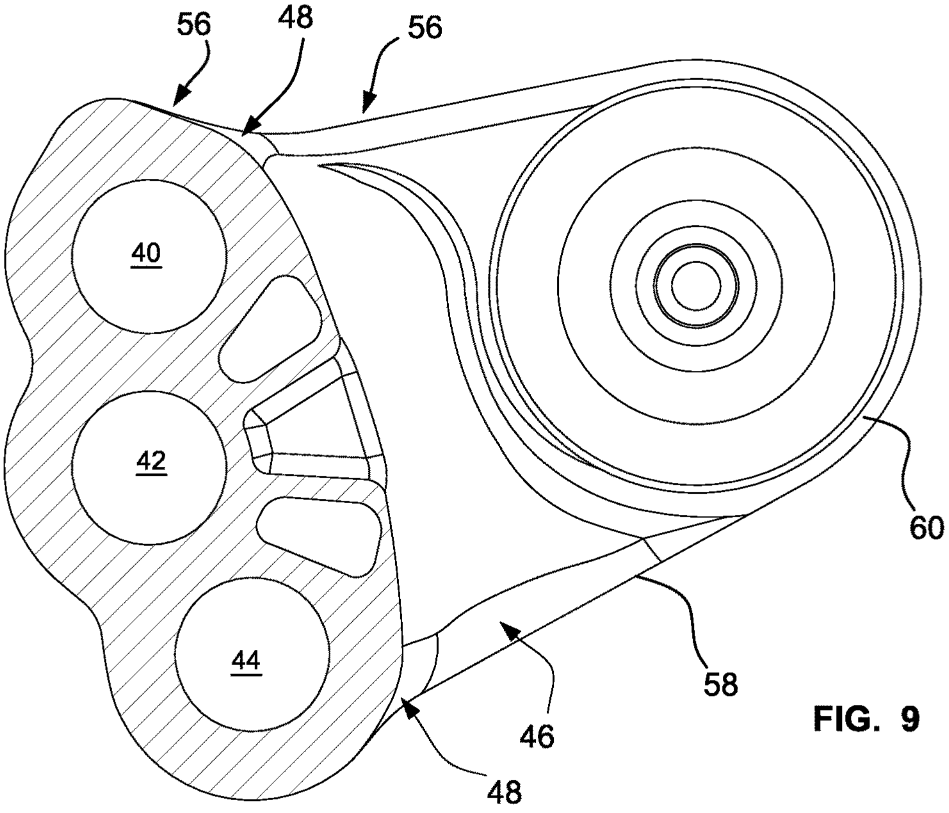

As can be seen from FIG. 9, when the pulley assembly is loaded such that the top and middle apertures 40, 42 are vertically aligned, the sheave axis S is above a horizontal medial line of the plates.

A roped access system for MRT is assembled using an embodiment of the invention as described below.

Figure 10:
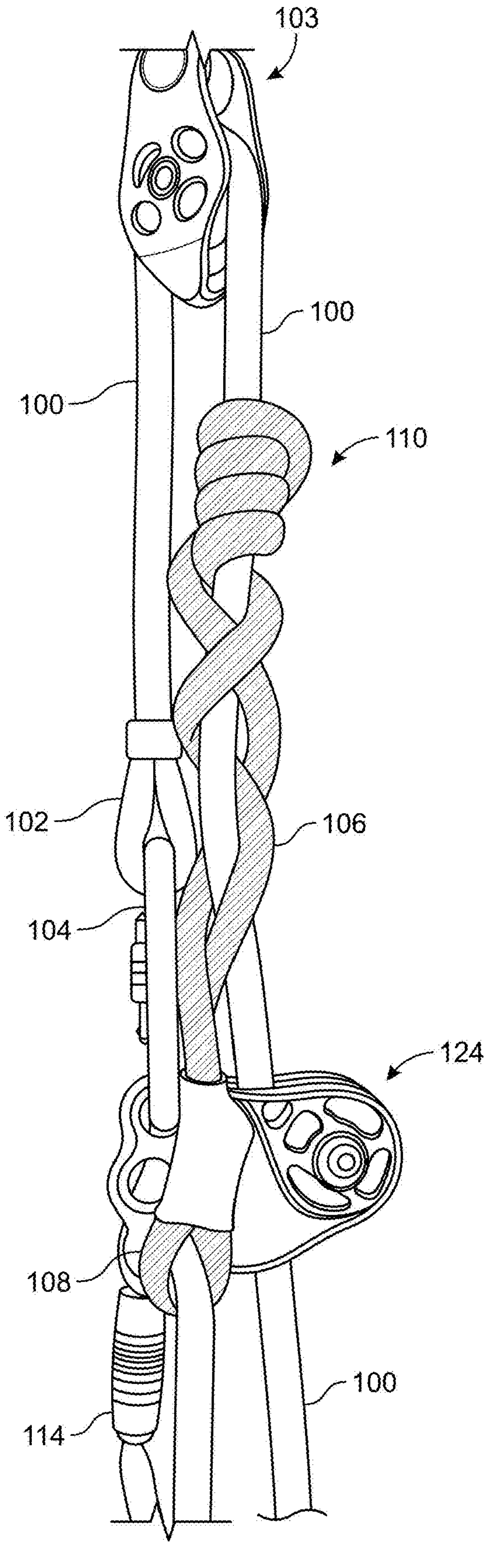
FIG. 10 shows an embodiment of the invention in use in a roped access system for MLT.

With reference to FIG. 10, A climbing rope 100 or other suitable line, having a loop 102 formed at one of its ends, is passed through a pulley 103 installed at a height above which access is required, such that two lengths of the climbing rope 100 extend downwards. (The pulley is optional: the rope may be carried on a tree branch, or may be carried by rings.) An upper connector 104 (typically a carabiner) constitutes a first connector. The upper connector 104 is passed through the loop 102 and the top aperture 40 of a pulley assembly 124 embodying the invention. The end of the rope remote from the loop 102 is passed downwardly through the rope passage 46 (between the intermediate regions 38 of the plates 30, 32) of the pulley assembly 124. The plates 30, 32 may be pivoted to assist installation of the climbing rope 100.

A tether 106 has a respective loop 108, 108' formed at each of its ends. The tether is attached to the climbing rope 100 using a Prusik knot 110 (or other friction hitch) at a section of the climbing rope 100 above where it enters between the plates 30, 32. A lower connector 114 (typically a carabiner) constitutes a second connector. The lower connector 114 is passed through each loop 106, 108 of the tether and the bottom aperture 44 of a pulley assembly 124, such that the plates 30, 32 pass between the loops 108.

The lower connector 114 can be secured to a load-bearing member of a user's harness to enable use of the access system in the manner described above.

Figure 11:
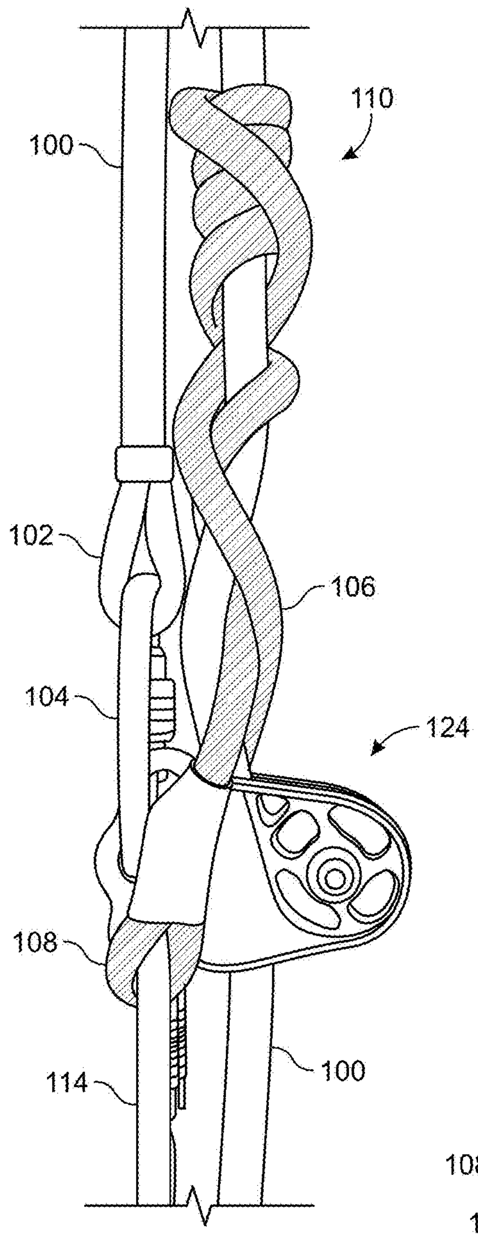
FIG. 11 shows a variation of the embodiment of FIG. 10.

Alternatively, the upper connector 104 may be connected to the middle aperture 42, as shown in FIG. 11. If this is done, other items of equipment may be connected to the middle aperture 42. For example, a work positioning system can be connected to the middle aperture 42.

Figure 12:
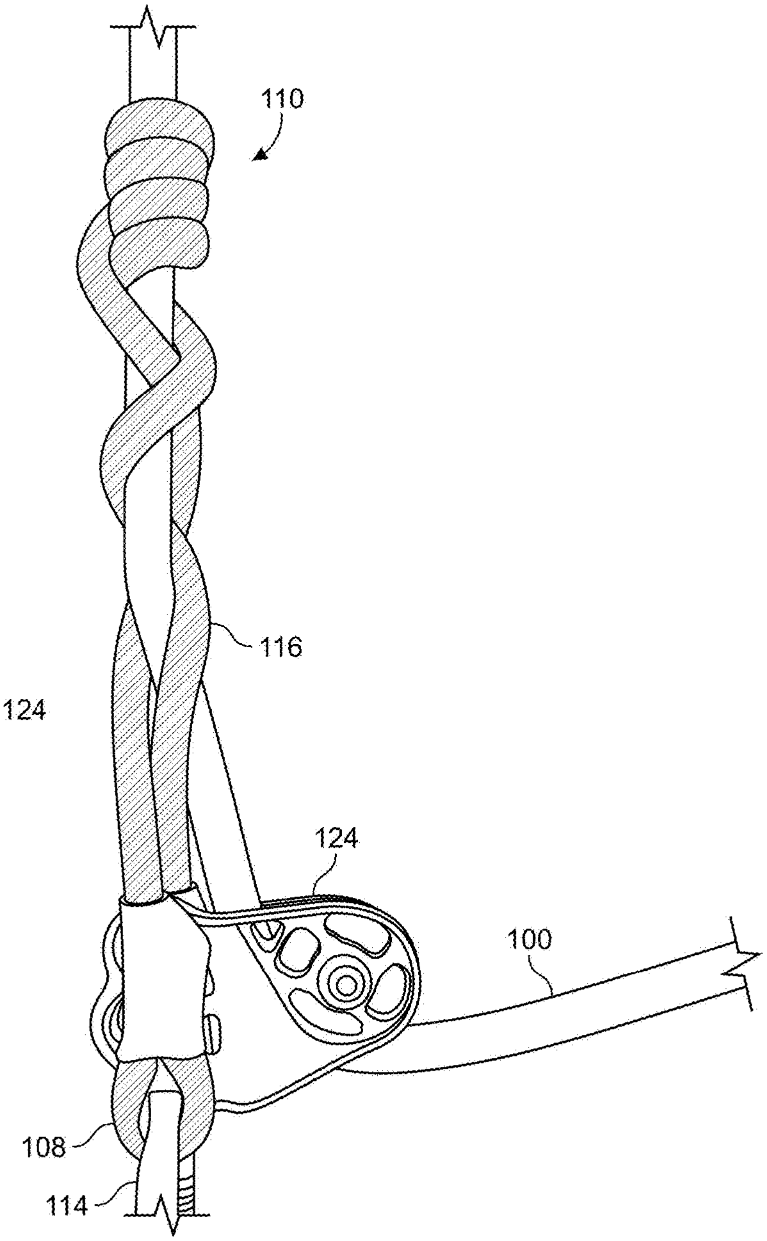
FIG. 12 shows an embodiment of the invention in use in a roped access system for SLT.
Figure 13:
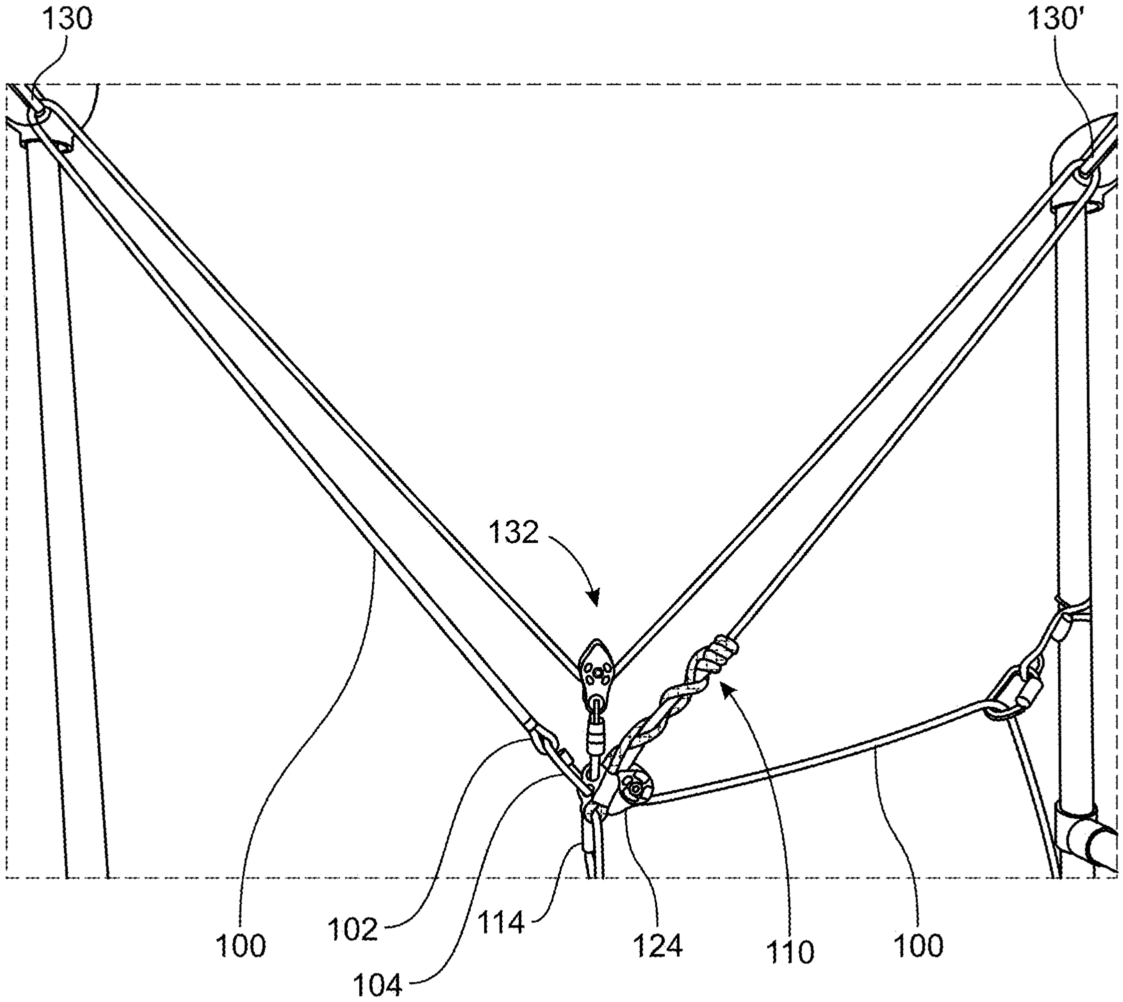
FIG. 13 shows an embodiment of the invention in use in a roped access system using multiple anchors

FIG. 12 shows an embodiment of the invention configured for use in SRT, with corresponding components being labelled with the same numbers as in FIGS. 10 and 11.

Provision of three apertures 40, 42, 44 in the plates and the wide range of angles at which ropes can enter the rope passage 46. In this embodiment, the climbing rope 100 passes over two anchor loops 130, 130' (which could alternatively be pulleys). An intermediate pulley 132 is disposed on the climbing rope between the two anchor loops 130, 130'.

In this embodiment, the upper connector 104 is connected to the middle aperture 42, the intermediate pulley is connected to the top aperture 40 by a connector, and the lower connector 114 is connected to the bottom aperture 44 of the pulley assembly 124. This is just one example of a more complex arrangement that can be achieved using embodiments of the invention.

Figure 14A:
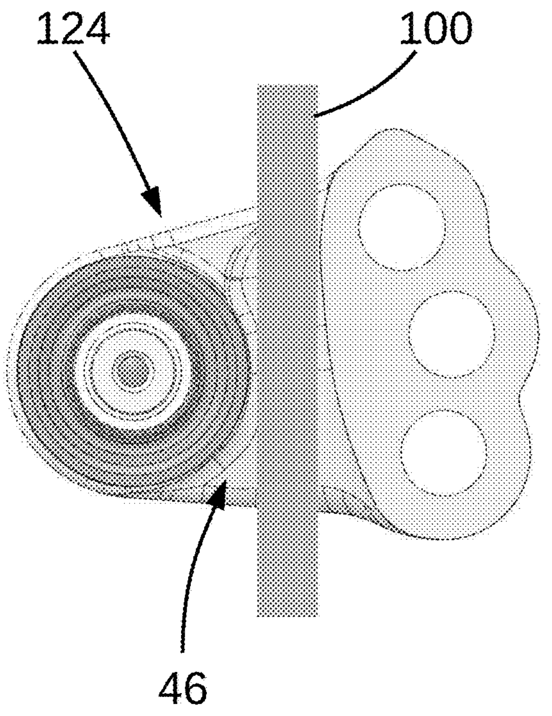
FIGS. 14*a* and 14*b* are cross-sectional views of an embodiment of the invention that shows the passage of a rope as the assembly adopts different angles with respect to the rope.
Figure 14B:
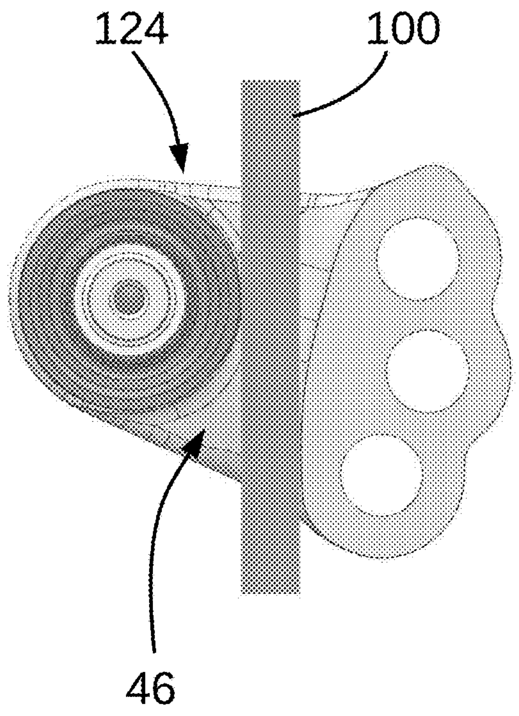

To allow the pulley to adapt to pivoting movement and rotation when being used with a Prusik cord, and to accommodate the climbing rope 100 approaching at a range of angles, the inside face of the rope passage 46 is curved in a convex shape. The resulting rope arrangement is shown in FIGS. 14*a* and 14*b*. When loaded and unloaded in a roped access system, a pulley assembly 124 will change the angle that it hangs at relative to the climbing rope 100, as will be seen in the different arrangement shown in the two FIGS. 14*a* and 14*b*. In a conventional pulley, this would cause the side plates to rub against the rope. In embodiments of this invention, due to the rope channel 46 being curved, the body of the pulley assembly 124 is able to pivot about the sheave axis without causing the climbing rope 100 to contact the rope channel 46. This means that the pulley is able to function at an increased range of angles without causing friction from the climbing rope 100 rubbing on the rope channel 46. By keeping the climbing rope 100 as straight as possible (or at least straighter than in a convention pulley assembly) and not introducing bends, friction between the climbing rope 100 and the pulley assembly 124 is minimised, which means that operational efficiency of the system in maximised.

What is claimed is:

1. A pulley assembly, comprising:

first and second spaced plates; and a sheave carried by both the first and second plates for rotation about an axis normal to the plates, at least one aperture formed through each one of the plates in a direction parallel to the sheave axis, the first and second plates having a closed condition in which the apertures of the plates are coaxial with one another and a portion of each one of the plates in a vicinity of the coaxial apertures are in contact with one another, so that the plates in the closed condition form a rope passage delimited by the sheave and inner surfaces of the plates and extending from a top opening to a bottom opening, wherein a top portion of the plates in the closed position includes a top-facing lip that partially surrounds the top opening, and portions of the inner surfaces of the plates, located along a lower portion of the passage and extending in a direction toward the bottom opening, form curved walls that curve away from one another so that the lower portion of the passage forms a throat that widens progressively toward a bottom-most end of the passage and terminates in a bottom-facing lip that partially surrounds the bottom opening and flares outward and away from the bottom opening, wherein the bottom-facing lip is wider than the top-facing lip, the bottom opening partially delimited by the bottom-facing lip being wider than the top opening at the upper end of the rope passage.

2. The pulley assembly of claim 1, wherein a thickness of the plates at upper edge regions of the plates are of greater thickness than elsewhere on the plates.

3. The pulley assembly of claim 1, wherein each plate has a plurality of apertures including the at least one aperture, one of said plurality of apertures being a top aperture, formed through each plate in the direction parallel to the sheave axis, each of the apertures in respective plates being coaxial with a respective aperture in an other of the plates when the plates are in the closed condition.

4. The pulley assembly of claim 3, wherein the plurality of apertures of each plate comprises the top aperture, a middle aperture, and a bottom aperture.

5. The pulley assembly of claim 1, wherein a thickness of the plates increases toward a location adjacent to an upper opening of the rope passage.

6. The pulley assembly of claim 1, wherein, in the closed condition, one of the inner surfaces of the plates includes a convex curve facing the sheave, and having a length along a direction from the bottom opening to the top opening that is greater than a diameter of the sheave.

7. A roped access system, comprising:

a pulley assembly, which includes first and second spaced plates, and a sheave carried by both the first and second plates for rotation about an axis normal to the plates, at least one aperture formed through each one of the plates in a direction parallel to the sheave axis, the first and second plates having a closed condition in which the apertures of the plates are coaxial with one another and a portion of each one of the plates in a vicinity of the coaxial apertures are in contact with one another, so that the plates in the closed condition form a rope passage delimited by the sheave and inner surfaces of the plates and extending from a top opening to a bottom opening, and a top portion of the plates in the closed position includes a top-facing lip that partially surrounds the top opening, portions of the inner surfaces of the plates, located along a lower portion of the passage and extending in a direction toward the bottom opening, form curved walls that curve away from one another so that the lower portion of the passage forms a throat that widens progressively toward a bottom-most end of the passage and terminates in a bottom-facing lip that partially surrounds the bottom opening and flares outward and away from the bottom opening, wherein the bottom-facing lip is wider than the top-facing lip the bottom opening partially delimited by the bottom-facing lip being wider than the top opening at the upper end of the rope passage;

a climbing rope, a portion of said climbing rope passing through the rope passage of the pulley assembly; and a tether that is connected to the climbing rope above the pulley assembly by a friction hitch and to one or more of the at least one aperture of the pulley assembly, the friction hitch being configured to grip the climbing rope upon application of a downward force to the tether, and to release the climbing rope upon application of an upward force to the friction hitch by the plates of the pulley assembly.

8. The roped access system of claim 7, wherein a part of the climbing rope above the pulley assembly is fixed.

9. The roped access system of claim 7, wherein the climbing rope extends past the friction hitch upwardly from the pulley assembly to pass slidingly over one or more high point and then to extend downwardly to be fixedly connected to the pulley assembly.

10. The roped access system of claim 7, wherein each plate of said plates has a plurality of apertures including the at least one aperture, one of said plurality of apertures being a top aperture, formed through each plate in the direction parallel to the sheave axis, each of the apertures in respective plates being coaxial with a respective aperture in an other of the plates when the plates are in the closed condition, wherein the climbing rope is fixedly connected to the top aperture through a first connector.

11. The roped access system of claim 10, wherein the tether is connected, through a second connector, to one or more of the at least one aperture.

12. The roped access system of claim 11, wherein the second connector is suitable for connection to a component of a harness to transfer the weight of a user of the harness to the tether.

13. The roped access system of claim 7, wherein each plate has a plurality of apertures including the at least one aperture, one of said plurality of apertures being a top aperture, formed through each plate in the direction parallel to the sheave axis, each of the apertures in respective plates being coaxial with a respective aperture in an other of the plates when the plates are in the closed condition, and wherein the tether is connected to one or more of the at least one aperture other than the top aperture.

14. The roped access system of claim 13, wherein the plurality of apertures of each plate comprises the top aperture, a middle aperture, and a bottom aperture.

15. The roped access system of claim 7, wherein, in the closed condition, one of the inner surfaces of the plates includes a convex curve facing the sheave, and having a length along a direction from the bottom opening to the top opening that is greater than a diameter of the sheave.

16. The roped access system of claim 7, wherein a thickness of the plates at upper edge regions of the plates are of greater thickness than elsewhere on the plates.

17. The roped access system of claim 7, wherein a thickness of the plates increases toward a location adjacent to an upper opening of the rope passage.

* * * * *